(12) United States Patent
Matsuo (10) Patent No.: US 7,741,989 B2
(45) Date of Patent: Jun. 22, 2010

(54) RADAR SYSTEM, RADAR TRANSMISSION SIGNAL GENERATION METHOD, PROGRAM THEREFOR AND PROGRAM RECORDING MEDIUM

(75) Inventor: Shingo Matsuo, Tokyo (JP)

(73) Assignee: NEC Corporation, Tokyo (JP)

( * ) Notice: Subject to any disclaimer, the term of this patent is extended or adjusted under 35 U.S.C. 154(b) by 71 days.

(21) Appl. No.: 12/055,484

(22) Filed: Mar. 26, 2008

(65) Prior Publication Data

US 2008/0316084 A1 Dec. 25, 2008

(30) Foreign Application Priority Data

Mar. 28, 2007 (JP) .............................. 2007-084147

(51) Int. Cl.
*G01S 13/00* (2006.01)
(52) U.S. Cl. .......................... 342/21; 342/118; 342/204
(58) Field of Classification Search ..................... 342/21
See application file for complete search history.

(56) References Cited

U.S. PATENT DOCUMENTS

| 5,347,283 | A * | 9/1994 | Krizek et al. ................ 342/201 |
| 5,942,688 | A * | 8/1999 | Kimura et al. ................ 73/598 |
| 6,097,329 | A * | 8/2000 | Wakayama ................ 342/26 D |
| 6,895,059 | B2 * | 5/2005 | Rogerson et al. ............. 375/295 |
| 2003/0004723 | A1 * | 1/2003 | Chihara ...................... 704/260 |
| 2003/0063662 | A1 * | 4/2003 | Uchino et al. ................ 375/226 |
| 2005/0172696 | A1 * | 8/2005 | Schmidt et al. .............. 73/1.44 |
| 2005/0179585 | A1 * | 8/2005 | Walker et al. ................ 342/134 |

FOREIGN PATENT DOCUMENTS

JP 2002082162 A 3/2002

* cited by examiner

*Primary Examiner*—Thomas H Tarcza
*Assistant Examiner*—Timothy A Brainard (57) ABSTRACT

Disclosed is a radar system capable of detecting near targets even in case of using discrete bands transmission signal. For this end, a discrete bands selection unit 1 selects discrete bands that meet the required radar parameters for detecting target information. A discrete bands synthetic waveform generation unit 2 suitably synthesizes center frequency signals of the respective discrete bands on the time base so that the signals for all of the discrete bands are transmitted within the transmission time of a particular discrete band that requires the longest time among the signals for the selected discrete bands selected. Alternatively, the center frequency signal is generated for the particular band requiring the longest transmission time, while signals sweeping from lower limit frequencies to upper limit frequencies are generated during the transmission time for the discrete bands other than the particular discrete band requiring the longest transmission time. Subsequently, the signals for the respective discrete bands are synthesized on the time base to generate discrete bands synthetic waveforms so that a discrete bands waveform storage unit 3 stores them in a transmission signal buffer.

13 Claims, 8 Drawing Sheets

Store at address 1

FIG. 5B

Store at address 2

RADAR SYSTEM, RADAR TRANSMISSION SIGNAL GENERATION METHOD, PROGRAM THEREFOR AND PROGRAM RECORDING MEDIUM

INCORPORATION BY REFERENCE

This application is based upon and claims the benefit of priority from Japanese patent application no. 2007-084147, filed on Mar. 28, 2007, the disclosure of which is incorporated herein in its entirety by reference.

FIELD OF THE INVENTION

The present invention relates to a radar system, a radar transmission signal generation method, a radar transmission signal generation program and a program recording medium, more specifically to a radar system for use discrete (or dispersed) bands in a low frequency band that is suitably applicable to the field of remote sensing, a radar transmission signal generation method, a radar transmission signal generation program and a program recording medium.

BACKGROUND OF THE INVENTION

In case of newly realizing a low frequency radar in Japan, it is required to use a low radio frequency band that can avoid the frequency bands used by a large number of existing radio stations. This is the reason why the radar transmission signal must unavoidably be discrete bands. Proposed in JP2002-82162A entitled "Pulse Compressed Radar System" is a technique for effectively improving display accuracy of targets by allocating only effective frequency bands in the radar transmission signal and eliminating invalid frequency bands that do not provide clear displays because frequency bands to provide clear displays varies depending upon targets in case of using discrete frequency bands.

Figure 7A:
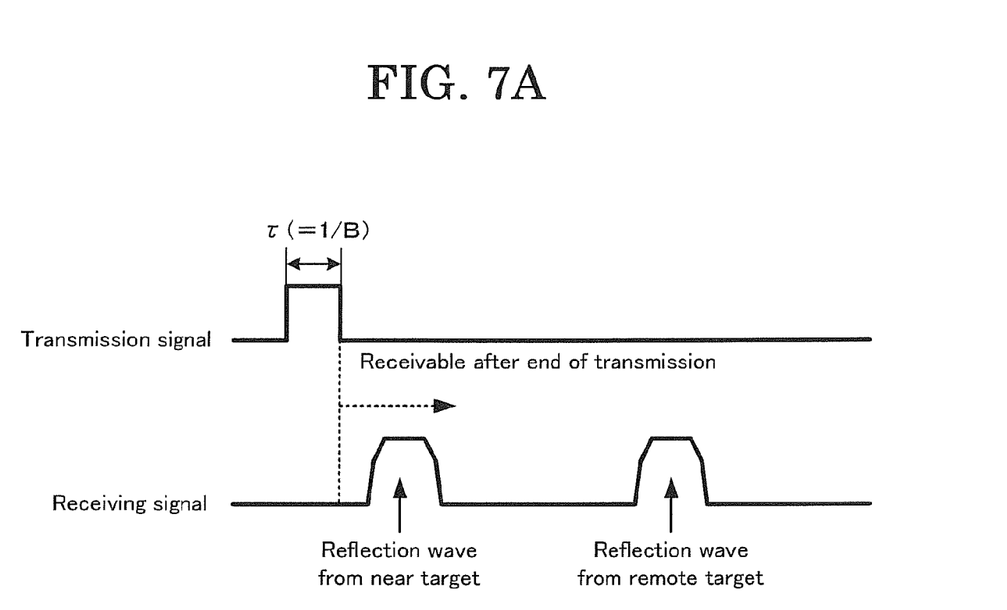
FIG. 7 illustrates the relationship between the transmission time of the radar transmission signal and the receiving time.
Figure 7B:
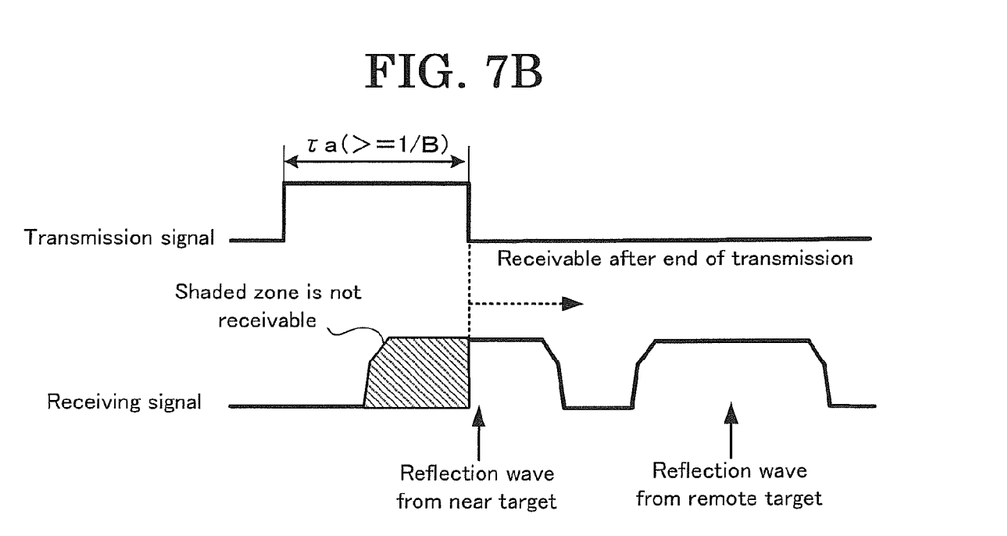

When generating a transmission signal waveform in, for example, a band B in a general radar system, it is normal to adopt a chirp signal in which the frequency varies continuously within a transmission time of $\tau=1/B$. Although the chirp signal is able to simultaneously achieve both wide bandwidth and large output, there is a possibility to receive a receiving wave (or a reflection wave) from near targets when using a narrower band and a longer transmission time because the reflection wave is received after termination of the transmission signal as shown in FIG. 7. FIG. 7 illustrates the relationship between the transmission time of the transmission signal and the receiving signal in the radar. FIG. 7A is an example of transmitting the transmission signal of a band B over a relatively short time $\tau(=1/B)$, while FIG. 7B illustrates an example of transmitting the transmission signal of a band B over a relatively long time $\tau a$ ($>1/B$).

As apparent from FIG. 7A, if the time $\tau(=1/B)$ is relatively short, the transmission operation is terminated before reflection waves from near targets arrive, thereby enabling to receive reflection waves from near targets as well as those from far targets without any trouble. On the other hand, if the transmission time $\tau a$ ($>1/B$) is relatively long as shown in FIG. 7B, the transmission operation is not terminated yet when reflection waves from near targets arrive, thereby disabling to detect near targets at locations corresponding to the shaded zone in FIG. 7B.

Figure 8A:
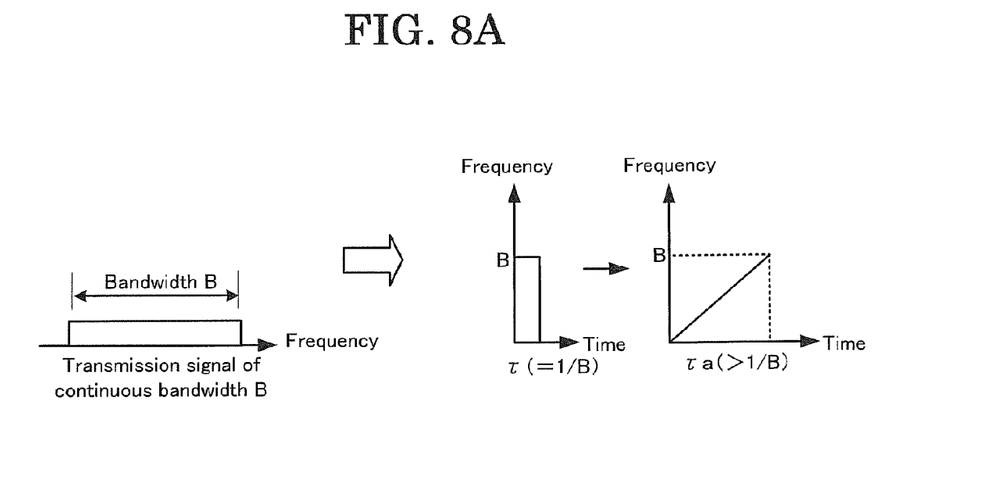
FIG. 8 illustrates transmission of discrete bands transmission signal by continuously sweeping.
Figure 8B:
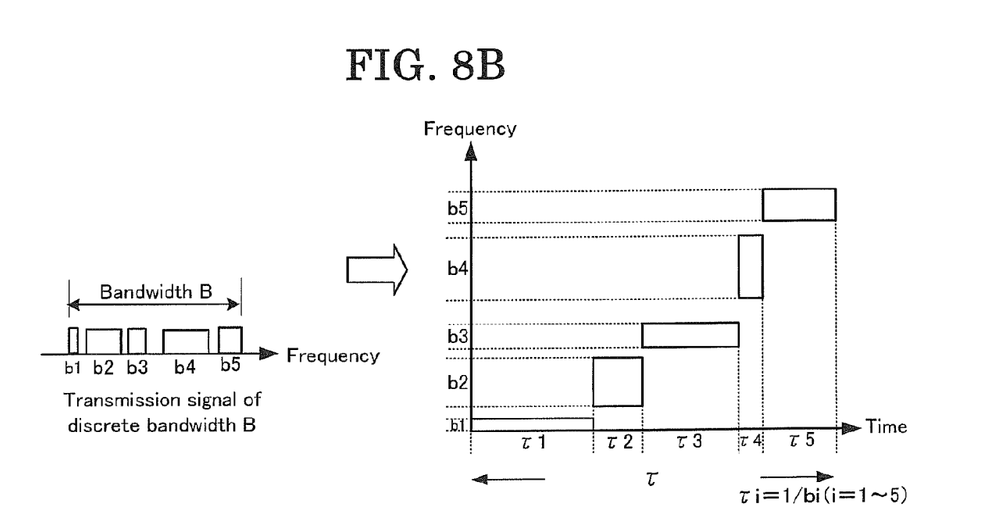

In contrast to the foregoing, when generating a transmission signal waveform of discrete bands b1, b2, ..., bn within a band B and continuously sweeping the frequency in the same manner as the chirp signal, there requires a longer transmission time $\tau$ as shown in FIG. 8B:

$$\tau = \tau 1(=1/b1) + \tau 2(=1/b2) + \ldots + \tau n(=1/bn)$$

This means that non-receivable near zones increase. Accordingly, in order to detect near targets, it is necessary to make the transmission time as short as possible in case of generating the discrete bands transmission signal. FIG. 8 is an illustration of transmitting the discrete bands transmission signal by continuously sweeping the frequency. FIG. 8A is an example of continuously varying frequencies in the band B. On the other hand, FIG. 8B is an example of continuously sweeping discrete signals within the band B over the respective required transmission times.

In other words, in case of transmitting the transmission signal of continuous band B as shown in FIG. 8A, it requires the shortest transmission time $\tau(=1/B)$ as described hereinabove with reference to FIG. 7. And the signal is transmitted by continuously varying frequencies as a chirp signal over a time $\tau a$ ($>1/B$) that is larger than the minimum time $\tau$. On the other hand, when transmitting the discrete bands transmission signal within the band B continuously for each discrete band in the same manner as the chirp signal as shown in FIG. 8B, it is required to transmit the respective discrete bands over the transmission time longer than the total of their shortest transmission times $\tau i=1/bi$ (where, $i=1\sim5$). As a result, it takes undesirably longer transmission time than preferable.

SUMMARY OF THE INVENTION

In view of the above problem associated with prior art, it is an object of the present invention to provide a radar system, a radar transmission signal generation method, a radar transmission signal generation program and a program recording medium that are capable of shortening the transmission time when using the transmission signal of discrete bands each having a narrower bandwidth, thereby enabling to expand detectable zone for near targets.

In order to achieve the above objective, the radar system, a radar transmission signal generation method, a radar transmission signal generation program and a program recording medium according to the present invention employ the following characteristic constructions:

(1) A radar system using discrete bands as radar transmission signal frequencies characterized in that all signals in the discrete bands are transmitted within a transmission time for the signal of the particular discrete band among the signals of the discrete bands requiring the longest transmission time by suitably synthesizing the signals in the respective discrete bands on the time base to generate a discrete band synthetic waveform.

(2) A radar system of the above (1) further comprising discrete bands selection means for enabling to designate radar parameters necessary for acquiring intended target information if there are a large number of discrete bands available for the radar transmission signal, and thus selecting and outputting one or more discrete bands as the radar transmission signal from the available discrete bands that meet the requirements for the radar parameters.

(3) A radar system of the above (2) further comprising discrete bands synthetic waveform generation means for suitably synthesizing and outputting center frequency signals of the respective discrete bands on the time base so that all signals of the respective discrete bands are transmitted within a transmission time for a particular discrete band requiring the longest transmission time among the signals for the discrete bands selected by the discrete bands selection means.

(4) A radar system of the above (2) further comprising discrete bands synthetic waveform generation means for synthesizing and outputting a discrete band synthetic waveform in such a manner that the signals for the respective discrete bands are transmitted in harmonizing with the transmission time of the signal for a particular discrete band requiring the longest transmission time among the signals for the discrete bands selected by the discrete bands selection means, the center frequency signal is generated as the signal for the particular discrete band requiring the longest transmission time, while generating signals sequentially changing frequencies in the transmission time from the respective lower limits to the upper limits for the discrete bands signals other than the particular discrete band requiring the longest transmission time, and then the signals for the respective discrete bands are synthesized on the time base.

(5) A radar system of the above (3) further comprising discrete band synthetic waveform storage means for storing in a transmission signal buffer the discrete bands synthetic waveforms that are generated by the synthetic bands waveform generation means.

(6) A radar system of the above (5), wherein the discrete bands synthetic waveform storage means stores in the transmission signal buffer by putting address information if a plural bands are selected by the discrete bands selection means and the discrete bands synthetic waveforms are generated for the plurality of discrete bands by the discrete bands synthetic waveform generation means.

(7) A radar system of the above (5) further comprising transmission signal generation means for generating the discrete bands synthetic waveforms that are stored in the transmission signal buffer by the discrete bands synthetic waveform storage means and outputting them as the radar transmission signals.

(8) A radar system of the above (7), wherein the transmission signal generation means generates and outputs as the radar transmission signal by selecting either one of the discrete bands synthetic waveforms to fit the particular transmission environment from digital data of a plurality of discrete bands synthetic waveforms if a plurality of discrete bands synthetic waveforms are stored in the transmission signal buffer.

(9) A radar transmission signal generation method for a radar system using discrete bands as radar transmission signal frequencies, comprising the steps of:

determining the signal for a particular band that requires the longest transmission time among the signals for all of the discrete bands; and generating a discrete bands synthetic waveform by suitably synthesizing the signals for the respective bands on the time base so that the signals for the other discrete bands are transmitted within the transmission time of the signal for the determined particular band;

thereby completing transmission of the signals for all of the discrete bands within the particular transmission time.

(10) A radar transmission signal generation method of the above (9) further comprising a discrete bands selection step for designating radar parameters required for acquiring intended target information if there are a large number of discrete bands available as the radar transmission signal and for selecting and outputting one or more discrete bands for the radar transmission signal from the available discrete bands to meet the requirements for the radar parameters.

(11) A radar transmission signal generation method of the above (10) further comprising a discrete bands synthetic waveform generation step for determining the signal of a particular discrete band requiring the longest transmission time among the signals for the discrete bands selected in the discrete bands selection step and for generating and outputting a discrete bands synthetic waveform by suitably synthesizing center frequency signals for the respective bands on the time base so that the signals for all of the discrete bands are transmitted within the longest transmission time.

(12) A radar transmission signal generation method of the above (10) further comprising a discrete bands synthetic waveform generation step for generating the center frequency signal for a particular discrete band requiring the longest transmission time, generating signals sweeping from lower limit frequencies to upper limit frequencies during the transmission time for respective discrete bands other than the particular discrete band requiring the longest transmission time so that signals for discrete bands selected in the discrete bands selection step are transmitted in harmonizing with the transmission time of the signal for the particular discrete band requiring the longest transmission time.

(13) A radar transmission signal generation program for performing the radar transmission signal generation method of the above (9) in a form executable by a computer.

(14) A program recording medium for recording the radar signal generation program of the above (13) in a recording medium that is readable by a computer.

The radar system, the radar transmission signal generation method, the radar transmission generation program and the program recording medium according to the present invention exhibit the following practical advantages:

Even in case of restricted use of only narrow discrete bands radar transmission signal, it is possible to minimize the transmission time and thus reducing near zones where reflection signals are unable to receive by appropriately synthesizing plural discrete bands signals for simultaneous transmission.

BRIEF DESCRIPTION OF THE DRAWINGS

In the accompanying drawings.

DETAILED DESCRIPTION OF EXEMPLARY EMBODIMENTS

Now, an exemplary embodiment of the radar system, the radar transmission signal generation method, the radar transmission signal generation program and the program recording medium according to the present invention will be described hereunder with reference the accompanying drawings. It is needless to say that the present invention covers not only a program for enabling a computer to execute the processing that will be described hereinafter as a firmware but also a recording medium in which such programs are saved.

Features of the Present Invention

Figure 1A:
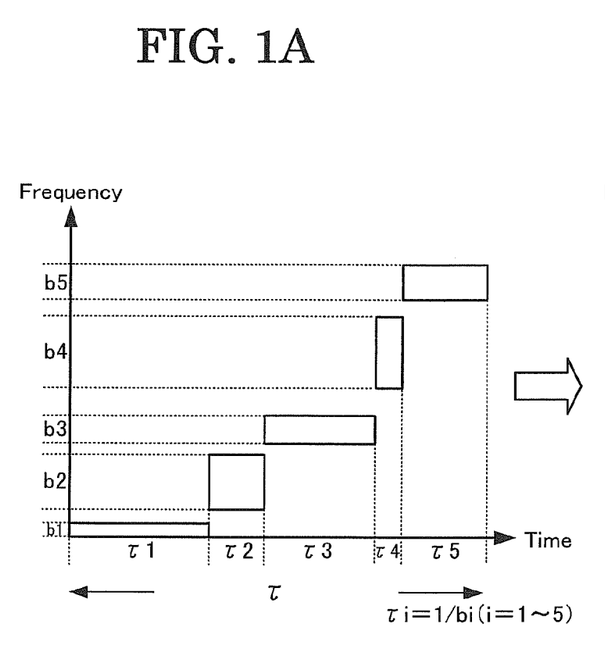
FIG. 1 illustrates an exemplary embodiment of the transmission method of radar transmission signal according to the present invention.

The radar system according to the present invention features in that it transmits a narrow discrete bands transmission signal and enables to receive reflection waves from near targets by reducing the transmission time. This means that in case of transmitting, for example, five discrete bands b1, b2, . . . , b5 within the band B as described hereinabove with respect to FIG. 8B, by determining the largest required transmission time $\tau i$ (where, i=1~5) among the five discrete bands bi (where, i=1~5), i.e., the discrete band b1 in this particular example, all other discrete bands b2~b5 are transmitted in parallel within this time $\tau 1$ (=1/b1) as shown in FIG. 1. FIG. 1 illustrates an example of the transmission method for radar transmission signal according to the present invention. FIG. 1A is a conventional transmission method, i.e., the method as shown in FIG. 8B for comparison with the transmission method according to the present invention as shown in FIG. 1B.

When transmitting the discrete bands transmission signal in the conventional manner as shown in FIG. 1A, the minimum required transmission time is the total of transmission times $\tau 1$ (=1/b1), $\tau 2$ (=1/b2), . . . , $\tau 5$ (=1/b5) for all of the discrete bands b1, b2, . . . , b5, thereby requiring the following minimum transmission time $\tau$ as described hereinabove with reference to FIG. 8B:

$$\tau = \tau 1 + \tau 2 +, \ldots, + \tau 5$$

Figure 1B:
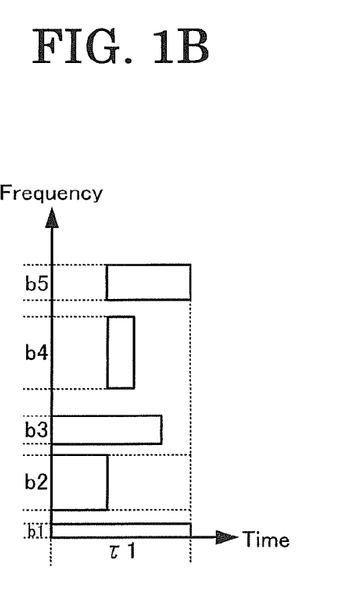

On the other hand, in the present invention, it requires at least the time corresponding to the largest required transmission time for only one of the transmission times $\tau 1, \tau 2, \ldots, \tau 5$ for the discrete bands b1, b2, . . . , b5 as shown in FIG. 1B. While the transmission signal for the discrete band that requires the largest transmission time is being transmitted, it is operated so that the transmission signals for all of the remaining discrete bands are also transmitted simultaneously.

On assuming that the discrete band requiring the largest transmission time is, for example, the discrete band b1 and its shortest transmission time is $\tau 1$ as shown in FIG. 1B, the signal for the band b1 is transmitted over the time $\tau 1$ (=1/b1) and the signals for all of the remaining bands b2~b5 are simultaneously transmitted within the transmission time $\tau 1$ with proper allocation in time. In the particular example as shown in FIG. 1B, the signals for the bands b2 and b3 are transmitted simultaneously with the start of transmission for the band b1. Subsequently, the signals for the band b4 and b5 are simultaneously transmitted so that their transmission is terminated before the end of transmission for the band b1.

Construction of the Exemplary Embodiment

Figure 2:
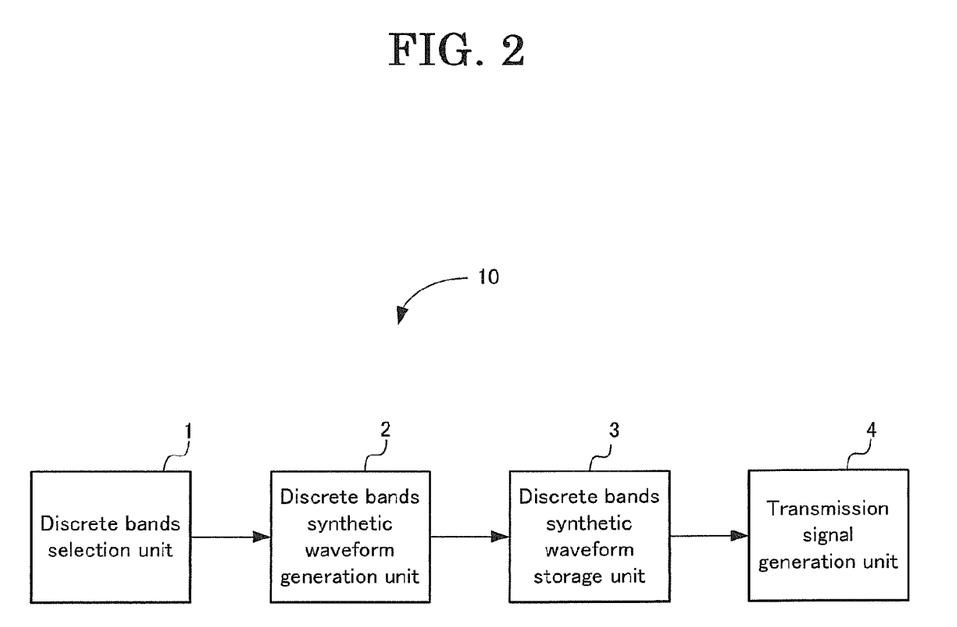
FIG. 2 is a functional block diagram of an exemplary embodiment of the radar system according to the present invention.

Now, the construction of the exemplary embodiment of the radar system according to the present invention will be described hereunder with reference to FIG. 2. FIG. 2 is a functional block diagram to show the construction of the exemplary embodiment of the radar system according to the present invention. The radar system 10 as shown in FIG. 2 comprises at least a discrete bands selection unit 1, a discrete bands synthetic waveform generation unit 2, a discrete bands synthetic waveform storage unit 3 and a transmission signal generation unit 4.

When there are a large number of available discrete bands, the discrete bands selection unit 1 has a function of automatically selecting combinations of discrete band signals that satisfy radar parameters (band B, transmission time $\tau$ and the like). The user or the like externally instructs such radar parameters depending upon the requirements for acquiring target information. The discrete bands synthetic waveform generation unit 2 generates a discrete bands waveform by adding on the time base discrete bands signals that are selected by the discrete bands selection unit 1 and then the discrete bands waveform is outputted as digital data.

The discrete bands synthetic waveform storage unit 3 has a function to add address information to the digital data of the discrete bands waveform outputted from the discrete bands synthetic waveform generation unit 2 for saving it in a transmission signal buffer. The transmission signal generation unit 4 converts the digital data of the discrete bands synthetic waveform stored in the transmission signal buffer and outputted from the discrete bands synthetic waveform storage unit 3 into an analog waveform, thereby generating and outputting the corresponding analog waveform as the radar transmission signal.

Operation of the Exemplary Embodiment

Now, the operation of the exemplary embodiment of the radar system 10 according to the present invention as shown in FIG. 2 will be described in detail. Firstly, it is assumed that the discrete bands available for the radar system 10 are seven bands, i.e., b1, b2, . . . , b7 and that the bandwidth threshold that is required for acquiring near target information is B or larger and the transmission time threshold is $\tau$ or less.

When these conditions are inputted as the radar parameters, the discrete bands selection unit 1 selects and outputs a combination of discrete bands that satisfies the radar parameters.

Figure 3A:
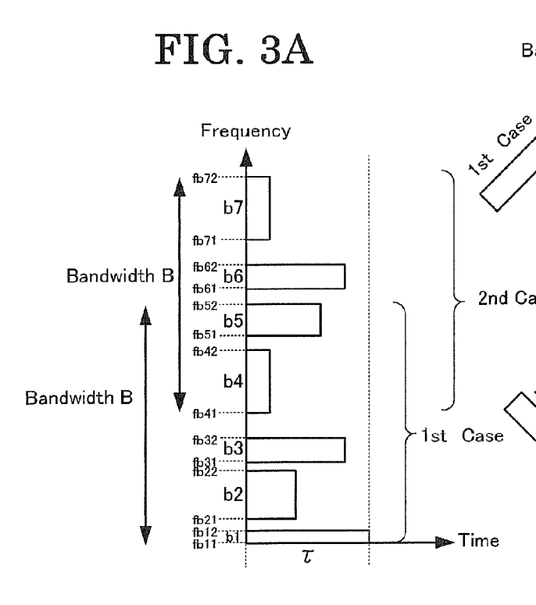
FIG. 3 illustrates an example of discrete bands selection operation in a discrete bands selection unit in FIG. 2.
Figure 3B:
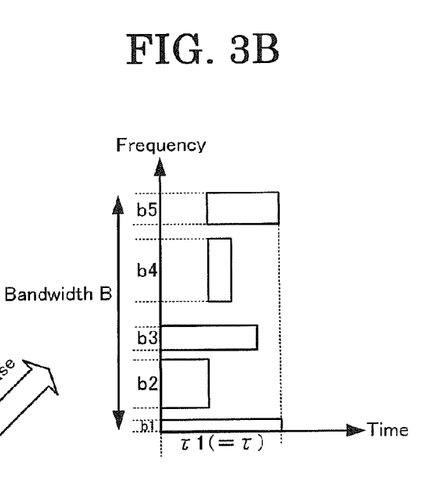
Figure 3C:
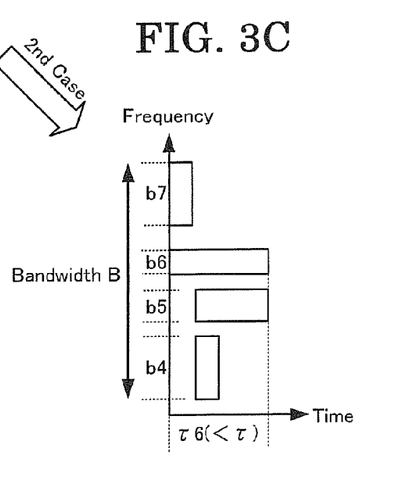

For example, the discrete bands selection operation in the discrete bands selection unit 1 in FIG. 2 is shown in FIG. 3. FIG. 3 is an illustration for describing one example of the discrete bands selection operation of the discrete bands selection unit 1 in FIG. 2. FIG. 3A shows the relationship between the available discrete bands b1, b2, . . . , b7 and the necessary bandwidth B and also the relationship between the transmission time $\tau$ and the bandwidth B. FIG. 3 B illustrates a first case as an example of the discrete bands selection result. On the other hand, FIG. 3C shows a second case of a different example of the discrete bands selection result.

As shown in FIG. 3 A, all of the available seven kinds of discrete bands b1, b2, . . . , b7 satisfy the condition within the required transmission time $\tau$. Moreover, the discrete band b1 is in the frequency range b11~b12, the discrete band b2 is in the frequency range fb21~fb22, . . . , and the discrete band b7 is in the frequency range fb71~fb72. It is assumed that the required bandwidth threshold B is met with the frequency range fb11~fb52 for the discrete bands b1~b5 in the first case, while the frequency range fb41~fb72 for the discrete bands b4~b7 in the second case as follows:

$$fb52 - fb11 \geq B \quad \text{(first case)}$$

$$fb72 - fb41 \geq B \quad \text{(second case)}$$

Accordingly, the discrete bands selection unit 1 selectively outputs either one or both of the frequency range for the discrete bands b1~b5 in the first case as shown in FIG. 3 B and frequency range for the discrete bands b4~b7 in the second case as shown in FIG. 3C.

It is to be noted here that the required minimum transmission time in the first case is $\tau 1$ ($=1/b1$) for the discrete band b1 among the discrete bands b1~b5. This means that the remaining discrete bands b2~b5 are suitably transmitted in parallel during the transmission time $\tau 1$ of the signal for the discrete band b1. On the other hand, in the second case, the required minimum transmission time is $\tau 6$ ($=1/b6$) for the discrete band b6 among the discrete bands b4~b7. All remaining bands b4, b5 and b7 are suitably transmitted in parallel during the transmission time $\tau 6$ of the signal for the discrete band b6.

It is to be noted as shown in FIG. 3 B and FIG. 3C that the required transmission time $\tau 1$ for the discrete band b1 is equal to the transmission time threshold $\tau$ (i.e., $\tau 1 = \tau$), while the required transmission time $\tau 6$ for the discrete band b6 is shorter than the transmission time threshold $\tau$ (i.e., $\tau 6 < \tau$). This means that the send case should be selected in priority, for example, in case of detecting nearer targets.

Figure 4A:
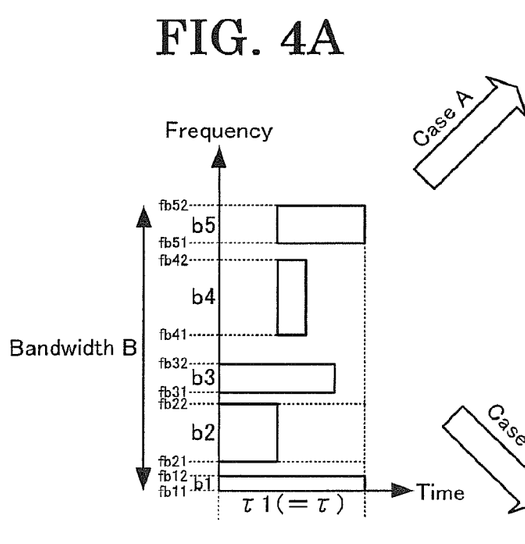
FIG. 4 illustrates an example of generating a synthetic waveform of discrete bands in a discrete bands synthetic waveform generation unit in FIG. 2.
Figure 4B:
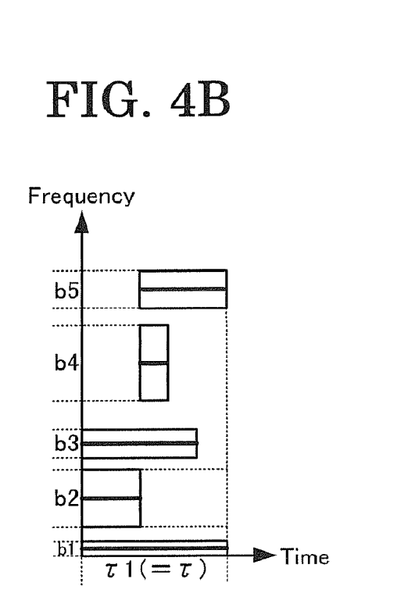

In the subsequent discrete bands synthetic waveform generation unit 2, the respective discrete bands signals are generated by combining, i.e., adding to one another on the time base discrete bands signals for either one or both of the first case or the second case that are selected by the discrete bands selection unit 1. A description will be given on a case of generating the synthetic waveform, for example, when the first case as shown in FIG. 3 is selected in the discrete bands selection unit 1 with reference to FIG. 4. FIG. 4 illustrates an example of the operation for generating the discrete bands synthetic waveform in the discrete bands synthetic waveform generation unit 2 as shown in FIG. 2. This is an exemplified operation of combining or synthesizing discrete bands b1~b5 that is shown as the first case in FIG. 3. FIG. 4A is an illustration of the discrete bands selection result in the discrete bands selection unit 1. FIG. 4B illustrates an example of the discrete bands synthetic waveform as a case A, while FIG. 4C illustrates a different example of discrete bands synthetic waveform as a case B.

As shown in FIG. 4A, the minimum required transmission time for transmitting band signals of the discrete bands b1~b5 that are selected as the first case in FIG. 3B is $\tau 1$ ($=\tau$) for the narrowest discrete band b1. In order to transmit all transmission signals for the discrete bands b1~b5 within the transmission time $\tau 1$, there are two ways of waveform synthesis: one is the case A as shown in FIG. 4B and the other is the case B as shown in FIG. 4C.

The case A as shown in FIG. 4 B is a method of transmitting only center frequencies of the respective discrete bands for the times required for transmission of respective discrete bands. That is, the center frequencies for discrete bands bi are ($fi2-fi1$)/2 (where, $i=1, 2, \ldots, 5$). The transmission signals of such center frequencies ($fi2-fi1$)/2 are transmitted for the required transmission times $\tau i$ (where, $i=1, 2, \ldots, 5$) with appropriate combinations on the time base. In the particular example of the case A as shown in FIG. 4B, a synthetic waveform is generated so that the discrete bands b2 and b3 are transmitted simultaneously with transmission of the discrete band b1, while the discrete bands b4 and b5 are transmitted at proper subsequent timing to be completely transmitted by the end of transmission of the discrete band b1.

Figure 4C:
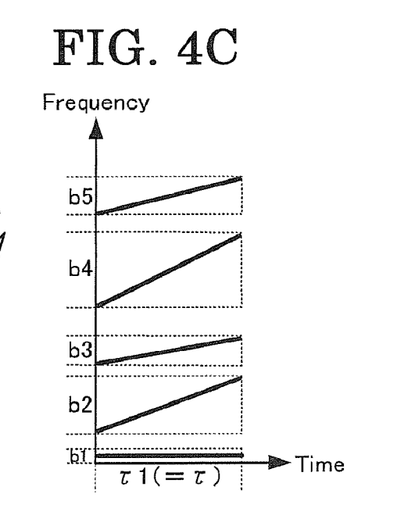

On the other hand, in a method of the case B as shown in FIG. 4C, a transmission signal of only the center frequency ($f12-f11$)/2 for the discrete band b1 is transmitted in the required transmission time $\tau 1$ ($=\tau$) for the discrete band b1 that is the longest transmission time among the signals for the discrete bands b1~b5. Other discrete bands bj (where, $j=2\sim5$) are transmitted sequentially by sweeping the frequency from the lower limit frequencies fj1 to the upper limit frequencies fj2 (where, $j=2\sim5$). In the particular example as shown in FIG. 4C, a synthetic waveform is generated by combining on the time base so that the discrete bands b2~b5 start to be transmitted from their lower limit frequencies f21~f51 at the start of transmission of the discrete band b1 and gradually increase their frequencies to their upper limit frequencies f22~f52 at the end of transmission of the discrete band b1.

In the discrete bands synthetic waveform generation unit 2, the transmission signals corresponding to the discrete bands b1~b5 are added on the time base in either case A as shown in FIG. 4B or case B as shown in FIG. 4C for generation of the discrete bands synthetic waveform that is outputted as the digital data. It is to be noted in the discrete bands synthetic waveform generation unit 2 that either one of the case A as shown in FIG. 4B and the case B as shown in FIG. 4C is selectively outputted. Alternatively, both of the case A and the case B can be outputted.

In the subsequent discrete bands synthetic waveform storage unit 3, the digital data of the discrete bands synthetic waveforms that are generated by the discrete bands synthetic waveform generation unit 2 are stored in a transmission signal buffer by adding address information. FIG. 5 illustrates examples of storing the discrete bands synthetic waveforms synthesized by the method, for example the case A in the discrete bands synthetic waveform generation unit 2 as shown in FIG. 4 (i.e., transmitting only center frequencies of the discrete bands b1~b5 for the time intervals required for respective discrete bands). FIG. 5 illustrates an exemplified operation of storing the discrete bands synthetic waveforms in the discrete bands synthetic waveform storage unit 3 in FIG. 2.

Figure 5A:
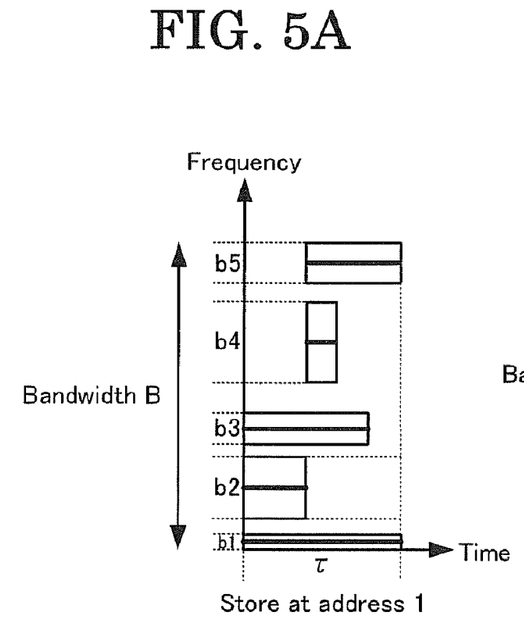
FIG. 5 illustrates an example of discrete bands synthetic waveform storage operation in a discrete bands synthetic waveform storage unit in FIG. 2.
Figure 5B:
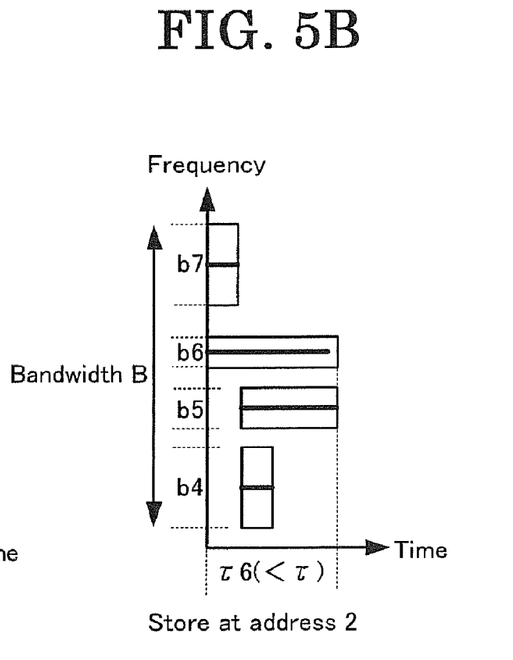

As shown in FIG. 5A, the digital data for the synthetic waveform that synthesizes the discrete bands b1~b5 selected as the first case in FIG. 3B by the method of the case A in FIG. 4B is stored in the address 1 in the transmission signal buffer. On the other hand, the digital data for the synthetic waveform that synthesizes the discrete bands b4~b7 selected as the second case in FIG. 3 C by the method of the case A as shown in FIG. 4B is stored in the address 2 in the transmission signal buffer. In case of storing only one discrete band synthetic waveform as the radar transmission signal, it may be stored fixedly in, for example, the address 1 in the transmission signal buffer without the need for adding address information.

Figure 6:
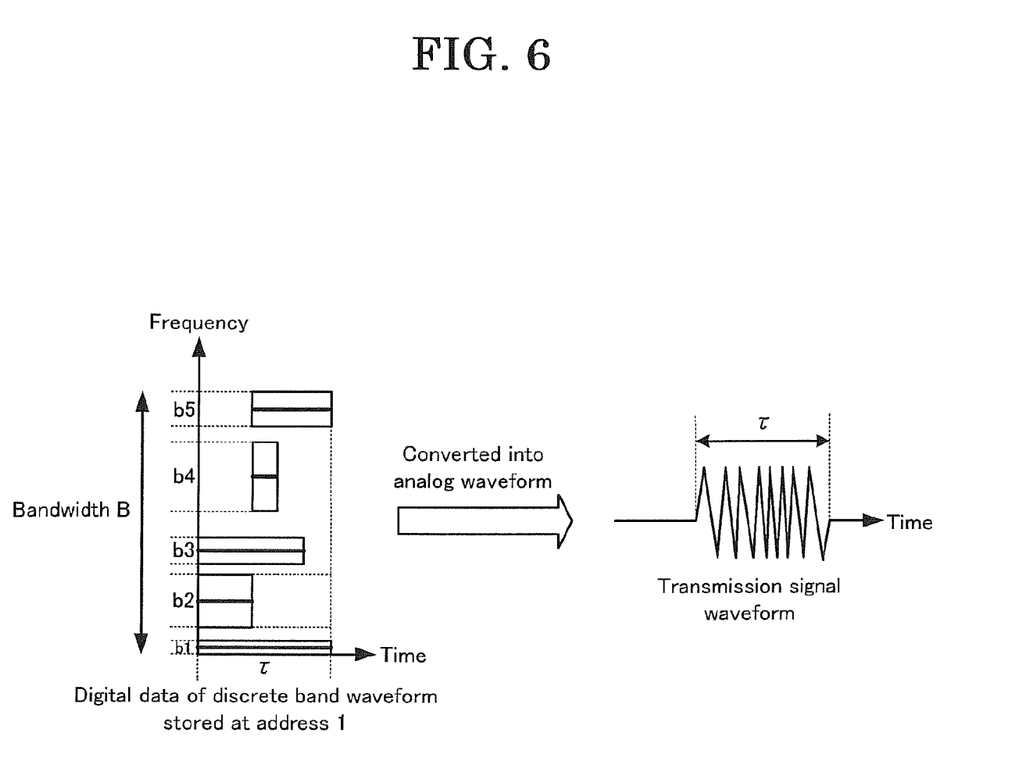
FIG. 6 illustrates an example of transmission signal generation operation in a transmission signal generation unit in FIG. 2.

In the subsequent transmission signal generation unit 4, an appropriate digital data of the synthetic waveform that is selected from the digital data of the various synthetic waveforms stored in the transmission signal buffer by the discrete bands synthetic waveform storage unit 3 depending upon the particular transmission environment for outputting as the radar transmission signal after converting into an analog waveform. FIG. 6 illustrates an exemplified operation of generating the transmission signal in the transmission signal generation unit 4 in FIG. 2. In this case, the digital data of the discrete bands synthetic waveforms that are stored at the address 1 in the transmission signal buffer in the discrete bands synthetic waveform storage unit 3 in FIG. 5 is selected and generated as the radar transmission signal for outputting. For example, in case of requiring a transmission signal of the bandwidth B in a lower frequency band as shown in FIG. 6, read out is the digital data of the synthetic waveform that is stored at the address 1 in the discrete bands synthetic waveform storage unit 3. On the other hand, in case of requiring a transmission signal of the bandwidth B in a higher frequency band, read out is the synthetic waveform stored at the address 2 in the discrete bands synthetic waveform storage unit 3. In either case, it is required to perform digital-to-analog conversion for generating and outputting the radar transmission signal.

As apparent from the above description, even in case of restricted use of narrow discrete bands, the exemplary embodiment of the present invention is able to suitably synthesize a plurality of discrete bands signals and transmit them simultaneously, thereby assuring to reduce the undetectable near regions by shortening the transmission time to the minimum possible time.

Although the exemplary embodiment of the present invention has been described in greater detail hereinabove, it should be noted that such embodiment is nothing but an example to demonstrate the present invention. It is obvious for a person having an ordinary skill in the art to make various modifications and alternations to fit particular applications without departing from the scope and spirit of the present invention.

What is claimed is:

1. A radar system using a plurality of discrete frequency bands, each discrete frequency band encompassing a plurality of frequencies, the discrete frequency bands used as radar transmission signal frequencies, the radar system characterized by a plurality of a signals corresponding to the plurality of discrete frequency bands and requiring a corresponding plurality of different transmission times to transmit the signals, such that a given signal of the plurality of signals requires a longest transmission time and such that all other signals of the plurality of signals require transmission times less than the longest transmission time, all the other signals being transmitted within a transmission time for the given signal requiring the longest transmission time by synthesizing all the signals other than the given signal on a time base to generate a discrete band synthetic waveform.

2. A radar system of claim 1 further comprising discrete bands selection means for enabling to designate radar parameters necessary for acquiring intended target information if there are a large number of discrete bands available for the radar transmission signal, and thus selecting and outputting one or more discrete bands as the radar transmission signal from the available discrete bands that meet the requirements for the radar parameters.

3. A radar system of claim 2 further comprising discrete bands synthetic waveform generation means for suitably synthesizing and outputting center frequency signals of the respective discrete bands on the time base so that all signals of the respective discrete bands are transmitted within a transmission time for a particular discrete band requiring the longest transmission time among the signals for the discrete bands selected by the discrete bands selection means.

4. A radar system of claim 3 further comprising discrete band synthetic waveform storage means for storing in a transmission signal buffer the discrete bands synthetic waveforms that are generated by the synthetic bands waveform generation means.

5. A radar system of claim 4, wherein the discrete bands synthetic waveform storage means stores in the transmission signal buffer by putting address information if a plural bands are selected by the discrete bands selection means and the discrete bands synthetic waveforms are generated for the plurality of discrete bands by the discrete bands synthetic waveform generation means.

6. A radar system of claim 4 further comprising transmission signal generation means for generating the discrete bands synthetic waveforms that are stored in the transmission signal buffer by the discrete bands synthetic waveform storage means and outputting them as the radar transmission signals.

7. A radar system of claim 6, wherein the transmission signal generation means generates and outputs as the radar transmission signal by selecting either one of the discrete bands synthetic waveforms to fit the particular transmission environment from digital data of a plurality of discrete bands synthetic waveforms if a plurality of discrete bands synthetic waveforms are stored in the transmission signal buffer.

8. A radar system of claim 2 further comprising discrete bands synthetic waveform generation means for synthesizing and outputting a discrete band synthetic waveform in such a manner that the signals for the respective discrete bands are transmitted in harmonizing with the transmission time of the signal for a particular discrete band requiring the longest transmission time among the signals for the discrete bands selected by the discrete bands selection means, the center frequency signal is generated as the signal for the particular discrete band requiring the longest transmission time, while generating signals sequentially changing frequencies in the transmission time from the respective lower limits to the upper limits for the discrete bands signals other than the particular discrete band requiring the longest transmission time, and then the signals for the respective discrete bands are synthesized on the time base.

9. A radar transmission signal generation method for a radar system using discrete frequency bands as radar transmission signal frequencies, each discrete frequency band encompassing a plurality of frequencies, the method comprising the steps of:
   determining a given signal that requires a longest transmission time among a plurality of signals corresponding to the plurality of discrete frequency bands, such that all other signals of the plurality of signals require transmission times less than the longest transmission time; and
   generating a discrete band synthetic waveform by synthesizing all the signals other than the given signal on a time base so that all the signals other than the given signal are transmitted within a transmission time of the given signal having the longest transmission time;
   thereby completing transmission of all the signals for all of the discrete frequency bands within the longest transmission time.

10. A radar transmission signal generation method of claim 9 further comprising a discrete bands selection step for designating radar parameters required for acquiring intended target information if there are a large number of discrete bands available as the radar transmission signal and for selecting and outputting one or more discrete bands for the radar transmission signal from the available discrete bands to meet the requirements for the radar parameters.

11. A radar transmission signal generation method of claim 10 further comprising a discrete bands synthetic waveform generation step for determining the signal of a particular discrete band requiring the longest transmission time among the signals for the discrete bands selected in the discrete bands selection step and for generating and outputting a discrete bands synthetic waveform by suitably synthesizing center frequency signals for the respective bands on the time base so that the signals for all of the discrete bands are transmitted within the longest transmission time.

12. A radar transmission signal generation method of claim 10 further comprising a discrete bands synthetic waveform generation step for generating the center frequency signal for a particular discrete band requiring the longest transmission time, generating signals sweeping from lower limit frequencies to upper limit frequencies during the transmission time for respective discrete bands other than the particular discrete band requiring the longest transmission time so that signals for discrete bands selected in the discrete bands selection step are transmitted in harmonizing with the transmission time of the signal for the particular discrete band requiring the longest transmission time.

13. A program recording medium for storing a radar transmission signal generation program for performing the radar transmission signal generation method of claim 9 in a form executable by a computer.

* * * * *